United States Patent [19]

Kim

[11] Patent Number: 5,345,265
[45] Date of Patent: Sep. 6, 1994

[54] GAMMA CORRECTION CIRCUIT FOR A VIDEO CAMERA

[75] Inventor: Seong-hoon Kim, Suwon, Rep. of Korea

[73] Assignee: Samsung Electronics Co., Ltd., Kyungki-Do, Rep. of Korea

[21] Appl. No.: 174,811

[22] Filed: Dec. 29, 1993

[30] Foreign Application Priority Data

Dec. 31, 1992 [KR] Rep. of Korea .................. 92-28465

[51] Int. Cl.$^5$ .............................................. H04N 9/69
[52] U.S. Cl. ..................................... 348/254; 348/675
[58] Field of Search ............. 348/234, 254, 255, 256, 348/675, 663, 712, 713; 358/32; H04N 9/69

[56] References Cited

U.S. PATENT DOCUMENTS

| | | | |
|---|---|---|---|
| 4,620,222 | 10/1986 | Baba | 348/254 |
| 4,833,527 | 5/1989 | Kondo | 348/675 |
| 5,194,943 | 3/1993 | Tomita | 348/255 |

Primary Examiner—James J. Groody
Assistant Examiner—Sherrie Hsia
Attorney, Agent, or Firm—Sughrue, Mion, Zinn, Macpeak & Seas

[57] ABSTRACT

A gamma correction circuit for single-plate type video camera having a correlation double sampling device and receiving the signal output from a complementary-filter-type charge coupled device (CCD) to thereby produce a color line sequence signal, includes a luminance signal detector for detecting the luminance signal frown the color line sequence signal; a first gamma-corrector for performing gamma-correction to the detected luminance signal from the luminance signal detector; a second gamma-corrector for gamma-correcting the color line sequence signal; a color difference signal detector for detecting the color difference signal from the color line sequence signal which is gamma-corrected by the second gamma-corrector; and a mixer for mixing the gamma-corrected luminance signal which is gamma-corrected by the first gamma-corrector with the gamma-corrected color difference signal which is detected by the color difference signal detector. Accordingly, the gamma-correction circuit performs gamma-correction to the color line sequence signal being output from the correlation double sampling device, so that the circuit can be simplified.

1 Claim, 5 Drawing Sheets

FIG. 1
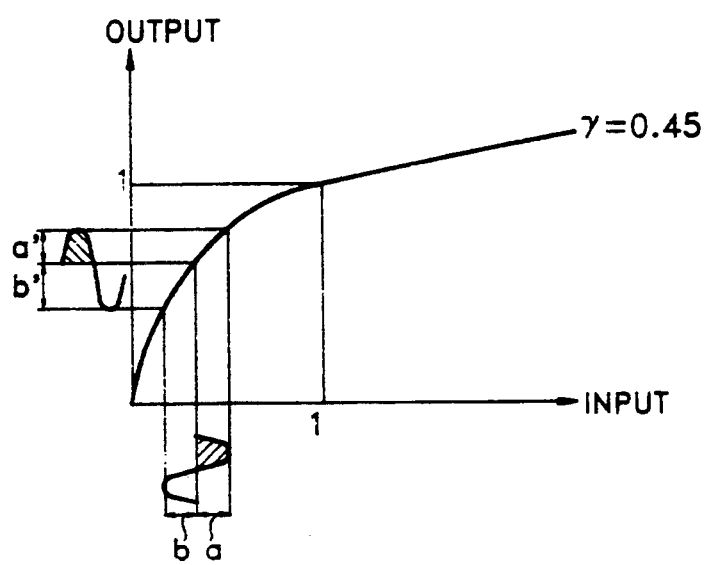
FIG. 2A FIG. 2B
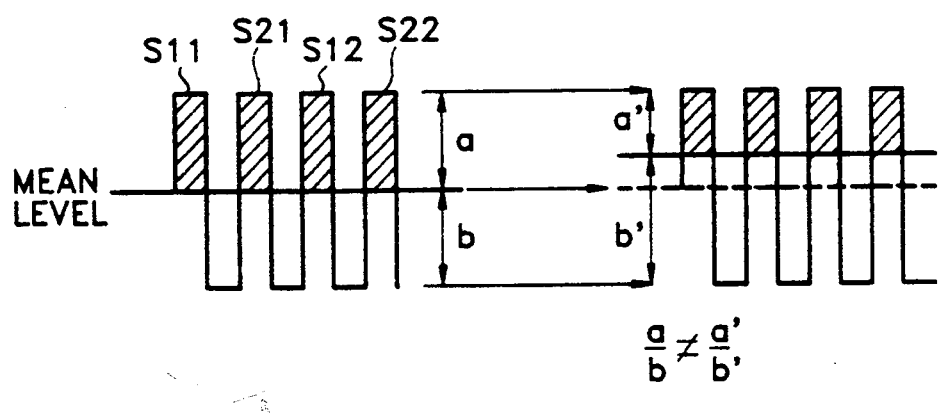
$\dfrac{a}{b} \neq \dfrac{a'}{b'}$

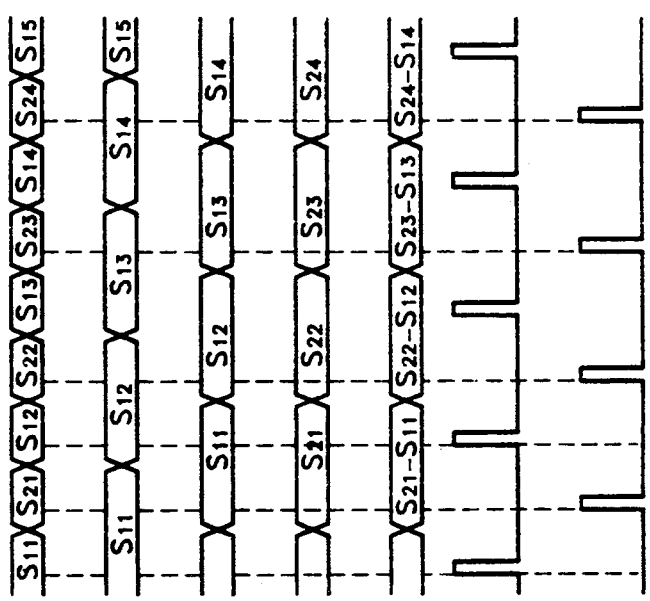

GAMMA CORRECTION CIRCUIT FOR A VIDEO CAMERA

BACKGROUND OF THE INVENTION

The present invention relates to a gamma correction circuit for a single-plate type video camera having a charged-coupled device (CCD) image pick-up device using complementary color filtering method, and more particularly, to a gamma correction circuit positioned between a correlating double-sampling device and a color signal separating circuit.

Picture tube shows a color reproduction in which the light beam does not vary in proportion to the image signal. A video camera for generating an image signal should take this characteristic of the picture tube into the consideration and, accordingly, correct the picture signal inversely to the non-linear color reproduction, which is called gamma correction. The non-linear color reproduction is called the gamma characteristic of the camera.

The conventional single-plate type video camera separates the color line sequence signal generated from the CCD image pick-up elements into primary colors by means of a color separation circuit, and then performs the gamma correction to the thus-separated primary color signals. That is, respective primary color signals (R, G and B) and the luminance signal need to be gamma-corrected separately. Thus the overall circuit becomes complex.

Especially, video cameras utilizing digital signal processing are restricted in that the resolution of the parts constituting the gamma-correction circuit is higher than those of other circuits.

Here, the gamma-characteristic is expressed thus:

$$\text{output} = (\text{input})^\gamma \tag{1}$$

From Equation (1), the output of the gamma-correction circuit is an exponential function of the exponent gamma with respect to the input thereof. That is, if the resolution of output signal is composed of eight bits, the resolution of the input signal should have ten or more bits. Accordingly, in the conventional video camera, the gamma-correction circuit should have the components of ten or more bits of resolution, which results in a higher cost of the manufactured goods.

SUMMARY OF THE INVENTION

Therefore, to solve the above-described problems, the object of the present invention is to provide a gamma correction circuit for simplifying the overall circuit construction in the video camera system having CCD image pick-up elements employing the complementary filtering method.

To achieve the object, the present invention provides a gamma correction circuit comprising a luminance signal extractor for extracting the luminance signal from a color line sequence signal output from CCD image pick-up elements; a first gamma-corrector for performing gamma-correction to the extracted luminance signal from the luminance signal extractor; a second gamma-corrector for gamma-correcting the color line sequence signal output from the CCD image pick-up elements; a color difference signal extractor for extracting the gamma-corrected color difference signal from the color line sequence signal which is gamma-corrected by the second gamma-corrector; and a mixer for mixing the gamma-corrected luminance signal from the first gamma-corrector with the gamma-corrected color difference signal extracted from the color difference extractor.

The gamma-correction circuit according to the present invention separates the chrominance signal output from the correlation double sampling device, into luminance signal and color difference signal, then performs gamma-correction to the luminance signal and the color-difference signal, both of which are again mixed so as to produce a gamma-corrected chrominance signal.

BRIEF DESCRIPTION OF THE DRAWINGS

These and other objects, features, aspects and advantages of the present invention will become more apparent from the following detailed description of the present invention when taken in conjunction with the accompanying drawings, in which:

FIG. 1 is a diagram illustrating a gamma characteristic curve;

FIGS. 2A and 2B are waveform diagrams showing a color line sequence signal being output from the correlation double sampling apparatus before and after the gamma correction, respectively;

FIGS. 6A–6G are waveform diagrams illustrating the signals present at various points of the apparatus of FIG. 5.

DETAILED DESCRIPTION OF THE INVENTION

FIG. 1 shows a gamma characteristic curve which is expressed in Equation 1, in which in general the gamma is used as about 0.45.

FIG. 2A shows a color line sequence signal being output from the CCD. Referring to FIG. 2A, the color line sequence signal is a continuous signal train of S1 (S11, S12 . . . ) and S2 (S21, S22 , . . . ). Here, the S1 value can be described as having the following components.

$$S1 = Mg + Ye \text{ or } S1 = Ye + Cy \tag{2}$$

Likewise, the S2 value can be described as having these components:

$$S2 = G + Cy \text{ or } S2 = Cy + Mg \tag{3}$$

where Mg, Ye, G and Cy are signal components corresponding to each color filter of a complementary filter.

Then, the luminance signal (Equation 4) and the color difference signals (Equations 5) are determined using the S1 and S2 values as follows:

$$\begin{aligned} S1 + S2 &= (Mg + Ye) + (G + Cy) \\ &= (Ye + G) + (Cy + Mg) \\ &= 2R + 2B + 3G \end{aligned} \tag{4}$$

$$\begin{aligned} S1 - S2 &= (Mg + Ye) - (G + Cy) \\ &= 2R - G \end{aligned} \tag{5}$$

$$S1 - S2 = (Ye + G) - (Cy + Mg)$$
$$= -(2B - G)$$

As shown in Equations (4) and (5), the luminance and color difference signals can be separated by the sum of or difference between S1 and S2.

FIG. 2B shows a change in the mean level of color line sequence signal, i.e., the level of the luminance signal in the case of a direct compensation on the color line sequence signal illustrated in FIG. 2A according to the gamma characteristic shown in FIG. 1. As can be seen from Equation (1), the gamma characteristic is a form of a non-linear exponential function, so that the ratio of the high to low levels with reference to the mean level of the input signal becomes different from that of the output signal. That is, when the color line sequence signal is corrected directly via the gamma circuit, the corrected color line sequence signal has a changed mean level, and thereby the luminance signal shown in Equation (4) has a changed level.

Accordingly, the gamma correction circuit of the present invention separates the luminance signal and color difference signal from the color line sequence signal, and preforms a gamma correction operation for each signal.

Figure 3:
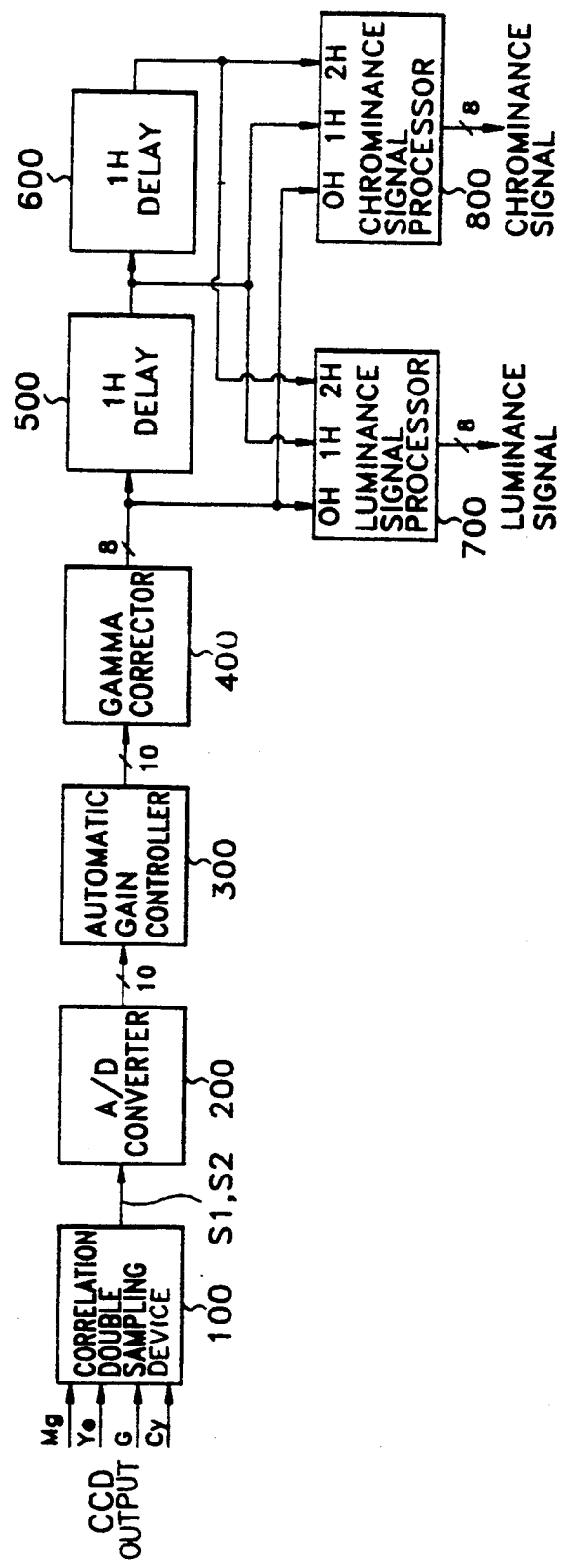
FIG. 3 is a block diagram showing a video camera adopting a gamma correction circuit according to the present invention.

FIG. 3 is a block diagram showing a video camera adopting a gamma correction circuit according to the present invention. The apparatus shown in FIG. 3 comprises a correlation double sampling device 100 for receiving signal components of Mg, Ye, G and Cy being output from a CCD (not shown) and thereby producing a color line sequence signal; an analog-to-digital (A/D) converter 200 for converting the signal output from correlation double sampling device 100 into digital form; an automatic gain controller 300 for automatically controlling the gain of signal being output from A/D converter 200; a gamma corrector 400 for performing gamma correction with respect to the output signal from automatic gain controller 300; a 1H delay 500 for delaying the output signal from gamma corrector 400 in one horizontal scanning period (1H) and thereby producing a 1H-delayed output; a 1H delay 600 for again delaying the output signal of 1H delay 500 by 1H period; a luminance signal processor 700 for receiving the output signal from gamma corrector 400 and either signal of 1H delays 500 and 600 to thereby produce a contour-corrected luminance signal; and a chrominance signal processor 800 for receiving the output signal from gamma corrector 400 and either signal of 1H delays 500 and 600 and combining those signals with respect to each horizontal scanning line to thereby produce a chrominance signal.

Figure 4:
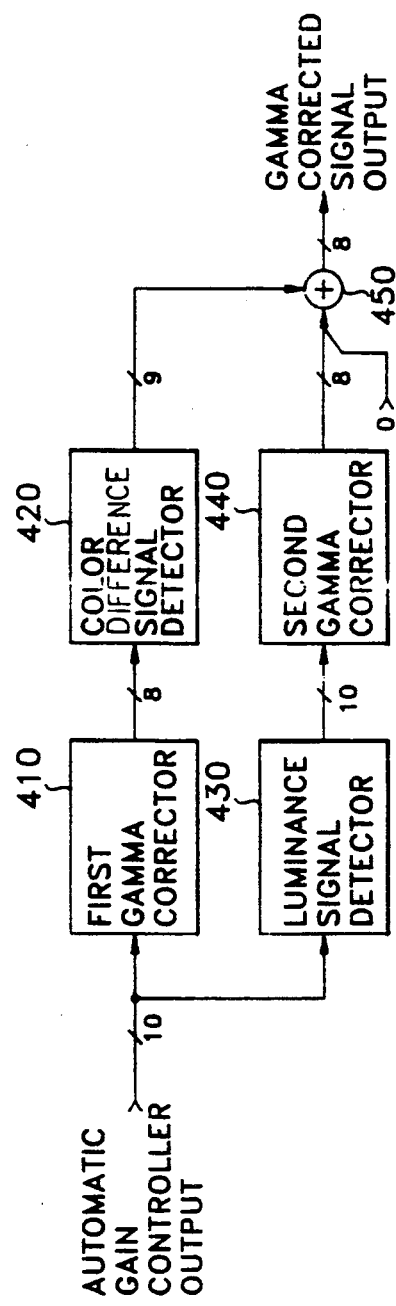
FIG.4 is a block diagram showing a preferable embodiment of the gamma correction apparatus shown in FIG. 3.

FIG. 4 is a block diagram showing an embodiment of gamma corrector 400 of FIG. 3. The circuit shown in FIG. 4 comprises a first gamma corrector 410 for receiving the color line sequence signal output from automatic gain controller 300 and thereby correcting the signal according to the gamma characteristic as shown in FIG. 1 to be output; a color difference signal detector 420 for extracting the color difference signal from the signal output from first gamma corrector 410; a luminance signal detector 430 for detecting a luminance signal from the output signal of automatic gain controller 300: a second gamma corrector 440 for receiving a luminance signal output from luminance signal detector 430 and thereby correcting the signal according to the gamma characteristic as shown in FIG. 1, in the same manner of first gamma corrector 410, to be output; and a mixer 450 for mixing the output signal of color difference signal detector 420 with the output signal of second gamma corrector 440 to thereby produce a gamma-corrected color line sequence signal.

Figure 5:
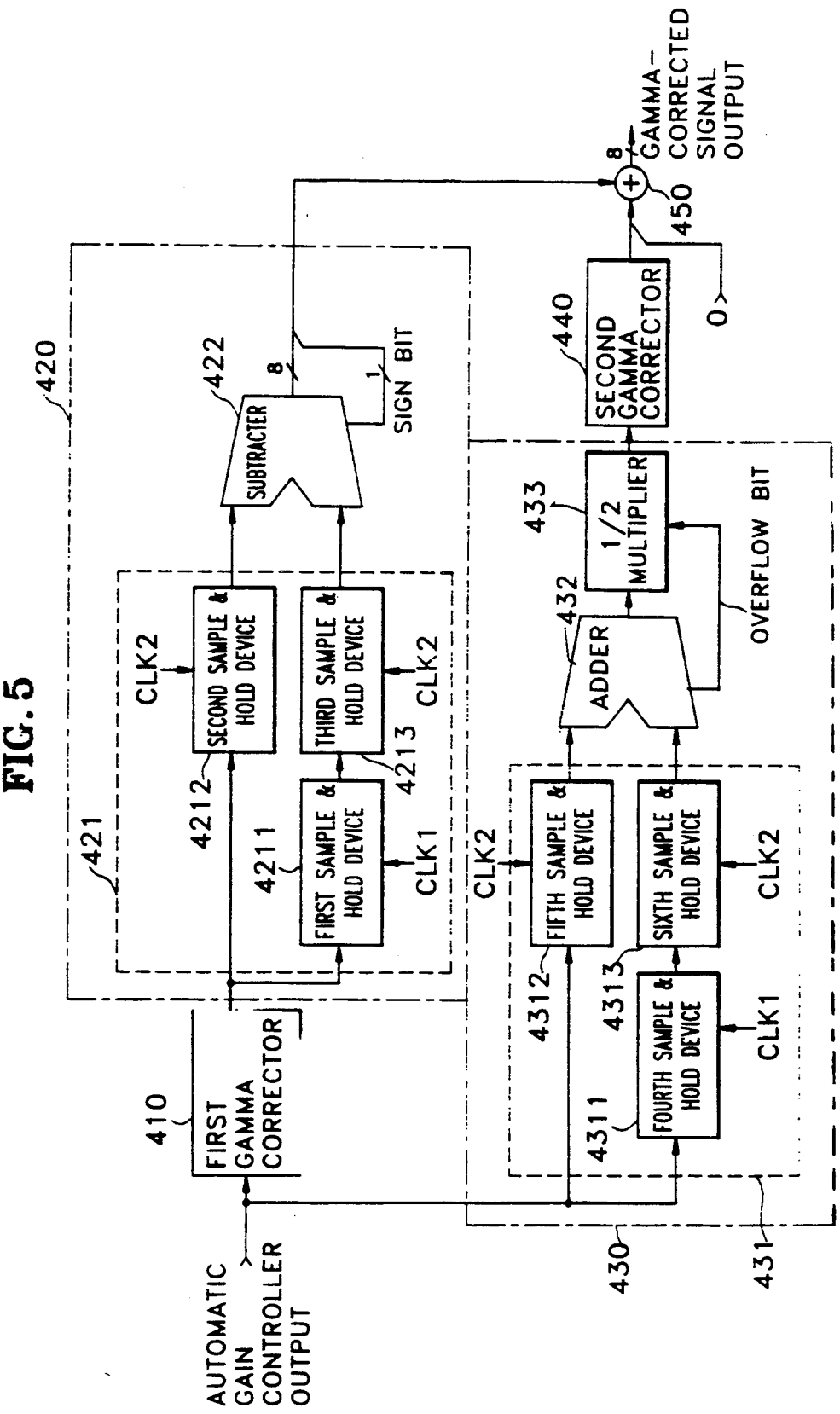
FIG.5 is a detailed block diagram of the gamma correction apparatus shown in FIG.4.

FIG. 5 is a block diagram of the detailed circuit of the apparatus shown in FIG. 4. Referring to FIG. 5, color difference signal detector 420 comprises a first timing controller 421 for controlling the timing of signals S1 and S2 of FIG. 2 whose levels should be compared each other, among the color line sequence signal output from first gamma corrector 410, and a subtracter 422 for comparing the signals output from first timing controller 421 to thereby produce the comparison output as a color difference signal.

First timing controller 421 has first and third sample-and-hold devices 4211 and 4213 for sampling and holding the S I level signal of FIG. 2, which is output from first gamma corrector 410 according to predetermined clock signals CLK1 and CLK2, respectively, and a second sample-and-hold device 4212 for sampling and holding the S2 level signal of FIG. 2 according to the predetermined clock signal CLK2.

Luminance signal detector 430 shown in FIG. 4 comprises a second timing controller 431 for controlling the timing with respect to the signal output from first gamma corrector 410, in the same manner as by first timing controller 421, and adder 432 and V2 multiplier 433 for detecting a mean value of the output signal of second timing controller 431.

Second timing controller 43 1 comprises fourth and sixth sample-and-hold devices 4311 and 4313 for sampling and holding the S1 level signal among the incoming color line sequence signal according to the predetermined clock signals CLK1 and CLK2,, respectively, in the same manner as by first and third sample-and-hold devices 4211 and 4213 of first timing controller 421, and a fifth sampling-and-holding device 4312 for sampling and holding the S2 level signal according to the predetermined clock signal CLK2.

FIGS. 6A through 6G are waveform diagrams of the signals present at various points of the circuit shown in FIG. 5. Here, FIG. 6A is a timing diagram of the signal output from first gamma corrector 410: FIG. 6B is a timing diagram of the signal output from first sample-and-hold device 4211; FIG. 6C is a timing diagram of the signal output from third sample-and-hold device 4213: FIG. 6D is a timing diagram of the signal output from second sample-and-hold device 4212; FIG. 6E is a timing diagram of the signal output from subtracter 4221; FIG. 6F is a diagram showing the waveform of the first clock signal (CLK1); and FIG. 6G is a diagram showing the waveform of the second clock signal (CLK2).

Here, the operation of the present invention will be described with reference to FIGS. 3 through 6.

The color line sequence signal output from automatic gain controller 300 enters first gamma corrector 410 (FIG. 4) and luminance signal detector 430 (FIG. 4). First gamma corrector 410 gamma-corrects the incoming color line sequence signal according to the gamma characteristic shown in FIG. 1, to thereby output the gamma-corrected signal to color difference signal detector 420. Color difference signal detector 420 separates the color difference signal, shown in FIG. 6E, from the gamma-corrected color line sequence signal provided for by first gamma corrector 410, to thereby output the same.

First and second sample-and-hold devices 4211 and 4212 of first timing controller 421 receive the gamma-corrected color line sequence signal shown in FIG. 6A. First sample-and-hold device 4211 is synchronized with clock signal CLK1 shown in FIG. 6F, to thereby sample the S1 portion of the signal of FIG. 6A, so as to produce a sampled signal S1 as shown in FIG. 6B. Second sample-and-hold device 4212 is synchronized with clock signal CLK2 shown in FIG. 6G, to thereby sample the S2 portion of the signal of FIG. 6A, so as to produce a sampled signal S2 as shown in FIG. 6D.

The signal from first sample-and-hold device 4211, shown in FIG. 6B, enters third sample-and-hold device 4213. Third sample-and-hold device 4213 is synchronized with clock signal CLK2 applied to second sample-and-hold device 4212, to thereby latch the signal of FIG. 6B output from first sample-and-hold device 4211, so as to produce the delayed signal S1 shown in FIG. 6C.

The output signals from second and third sample-and-hold devices 4212 and 4213 enter subtracter 422 which subtracts the output signal of the third sample-and-hold device from that of the second sample-and-hold device 4212, to thereby produce the color difference signal as shown in FIG. 6E. At this moment, a sign bit which incurs due to the substraction is also produced, so that the number of output bits totals nine bits.

On the other hand, luminance signal detector 430, if it receives the signal output from automatic gain controller 300, detects the luminance signal by obtaining an arithmetic mean of S1 and S2.

That is, if luminance signal detector 430 receives the signal shown in FIG. 6A output from automatic gain controller 300, the timing is controlled by means of second timing controller 431 having fourth, fifth and sixth sample-and-hold devices 4311, 4312 and 4313 in the same manner as in first timing controller 421, to thereby produce the delayed signal S1 and the sampled signal S2 shown in FIGS. 6C and 6D, respectively. The output signals from fifth and sixth sample-and-hold devices 4312 and 4313 are transmitted to adder 432.

The summing result of adder 432 is output to ½ multiplier 433 which is located in the next unit. At this point, the overflow incurring bit which is generated due to the previous summing result is also transmitted to ½ multiplier 433. Here, ½ multiplier 433 attenuates the level of its input by 3 dB and outputs the attenuated signal.

The output signal of ½ multiplier 433 is sent to second gamma corrector 440. Second gamma corrector 440 gamma-corrects the luminance signal, in the same manner of first gamma corrector 410, and thereby outputs the same. Here, since the output signal is based on eight bits, it further includes one more bit of "0" (low level) representing a positive number to thus equal the number of bits from color difference signal detector 420, as a sign bit, which is thereby output to mixer 450.

Mixer 450 mixes the output signals of subtracter 422 and second gamma corrector 440, removes the sign bit therefrom, and thereby produces the purely gamma-corrected signal. Accordingly, the output signal of mixer 450 becomes one having eight bits.

As described above, the present invention gamma-corrects the color line sequence signal output from the correlation double sampling device, so that the gamma-correction circuit can be constructed in a simpler structure.

Moreover, the gamma correction circuit of the present invention helps reduce the cost of a product by obviating the unnecessarily high resolution of a color separation circuit, with the aid of this gamma correction circuit.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A gamma correction circuit for use in a video camera including a complementary-filter-type charge coupled device (CCD) and a correlation double sampling device receiving a signal produced from the CCD and producing a color line sequence signal, comprising:

a luminance signal detector for detecting the luminance signal from said color line sequence signal;

a first gamma-corrector for performing gamma-correction to the detected luminance signal from said luminance signal detector;

a second gamma-corrector for gamma-correcting said color line sequence signal;

a color difference signal detector for detecting the color difference signal from the color line sequence signal which is gamma-corrected by the second gamma-corrector; and a mixer for mixing the gamma-corrected luminance signal which is gamma-corrected by said first gamma-corrector with the gamma-corrected color difference signal which is detected by said color difference signal detector.

* * * * *